US006317950B1

(12) United States Patent
Irwin

(10) Patent No.: US 6,317,950 B1
(45) Date of Patent: Nov. 20, 2001

(54) PIPE CRIMPING APPARATUS

(75) Inventor: William James Irwin, County Londonderry (IE)

(73) Assignee: Resources Conservation Incorporated, Stamford, CT (US)

( * ) Notice: Subject to any disclaimer, the term of this patent is extended or adjusted under 35 U.S.C. 154(b) by 0 days.

(21) Appl. No.: 09/701,879

(22) PCT Filed: Jun. 7, 1999

(86) PCT No.: PCT/GB99/01649

§ 371 Date: Dec. 5, 2000

§ 102(e) Date: Dec. 5, 2000

(87) PCT Pub. No.: WO99/64206

PCT Pub. Date: Dec. 16, 1999

(30) Foreign Application Priority Data

Jun. 5, 1998 (GB) .................................................. 9812086

(51) Int. Cl.[7] ...................................................... B23P 19/04

(52) U.S. Cl. ........................... 29/237; 29/268; 29/243.56; 29/283.5

(58) Field of Search ................................ 29/237, 243.56, 29/235, 238, 221, 278, 261, 268, 283.5

(56) References Cited

U.S. PATENT DOCUMENTS

| | | | | |
|---|---|---|---|---|
| 2,235,616 | * | 3/1941 | Ice | 29/237 |
| 2,739,373 | * | 3/1956 | Kane, Jr. | 29/237 |
| 4,080,820 | * | 3/1978 | Allen | 29/237 |
| 4,829,805 | * | 5/1989 | Koehn | 29/237 |
| 5,511,297 | * | 4/1996 | Cross | 29/243.56 |
| 6,185,980 | * | 2/2001 | Law | 29/237 |
| 6,202,272 | * | 3/2001 | Jackson | 29/235 |

* cited by examiner

*Primary Examiner*—Joseph J. Hail, III
*Assistant Examiner*—Lee Wilson
(74) *Attorney, Agent, or Firm*—Ronald E. Greigg

(57) ABSTRACT

A pipe crimping apparatus comprises a holding device to externally engage and hold a joint to be crimped. The holding device has a concavity in which a part cylindrical plate member is secured, the concavity and plate member defining a part cylindrical clamping zone. One pair of crimping arms is pivotally mounted on the holding device. Each arm is movable relative to the clamping zone. Handles are provided to cause movement of the arms relative to the clamping zone wherein the arms, in a crimping movement, extend radially into the clamping zone to engage a joint, and impress by indentation portions of an outer socket end onto an inner spigot end to secure the same together.

21 Claims, 4 Drawing Sheets

PIPE CRIMPING APPARATUS

CROSS-REFERENCE TO RELATED APPLICATIONS

This is a 35 USC 371 application of PCT/GB 99/01649 filed on Jun. 7, 1999.

This invention relates to a pipe crimping apparatus for crimping the joints of pipe connections of the type having non-flux, non-solder joints, for example, those described in my UK Patent No. GB 2 219 644. The purpose of crimping is to secure one length of pipe to another length of pipe or to a pipe connector by impressing portions of the outer socket end onto the inner spigot end of the connection.

Accordingly, the present invention is a pipe crimping apparatus comprising holding means to externally engage and hold a joint to be crimped, the holding means having a concavity defining a part cylindrical clamping zone, at least one pair of crimping arms pivotally mounted on the holding means, each arm being movable relative to the clamping zone and means to cause movement of the arms relative to the clamping zone wherein the arms, in a crimping movement, extend radially into the clamping zone to engage a joint, and impress by indentation portions of an outer socket end onto an inner spigot end to secure the same together wherein the holding means is an elongate block with the concavity in one peripheral side with both ends of the block rebated to provide two cheeks between which a respective crimping arm is pivoted, the crimping arms being similarly cranked and mounted in mirror-image on the block with each arm provided at its crank to the respective cheeks of the block and the distal en of the outer part of each arm having a protuberance directed inwardly towards the clamping zone.

Preferably, a part cylindrical plate member is secured in the concavity with its axis normal to the longitudinal axis of the block, the clamping zone being provided in the plate member. Movement apart of the inner ends of the inner parts of the arms causes inward movement of the distal ends of the outer part of the arms. The plate member has desirably opposed cut-outs extending inwards from its respective sides to allow for movement of the arms therethrough.

Preferably also, the means to cause movement is a pair of handles with one end of each handle pivoted to a respective inner end of one inner part of an arm, the handles being pivoted together through a link near to the one end with the other end of the handles serving as hand grips. Movement of the hand grips together causes movement apart of the inner ends of the arms and consequential inward crimping movement of the distal ends of the arms.

Preferably further, the block has a spindle extending normally from the other longitudinal side to pass through a bore in the link, the spindle moving freely through the bore on closing and opening of the hand grips.

BRIEF DESCRIPTION OF THE DRAWINGS

An embodiment of the present invention will now be described, by way of example, with reference to the accompanying drawings, in which.

Figure 2:
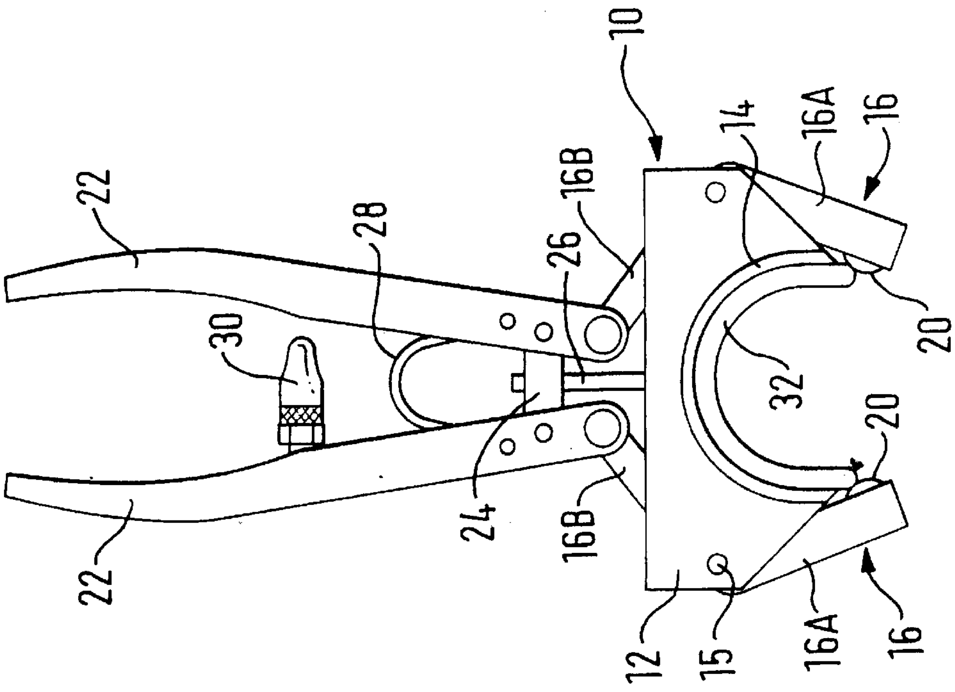
FIG. 2 is a front view of the apparatus.
Figure 1:
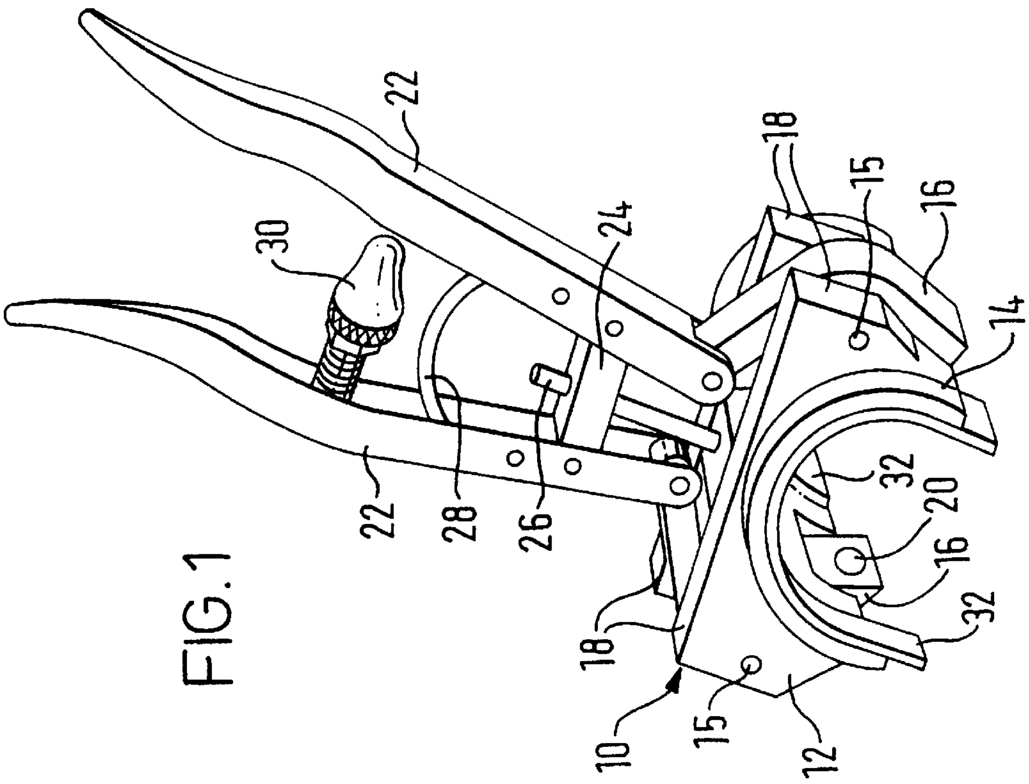
FIG. 1 is a perspective view of a pipe crimping apparatus according to the present invention and showing a first connection between a pair of crimping arms and a pair of handles.
Figure 3:
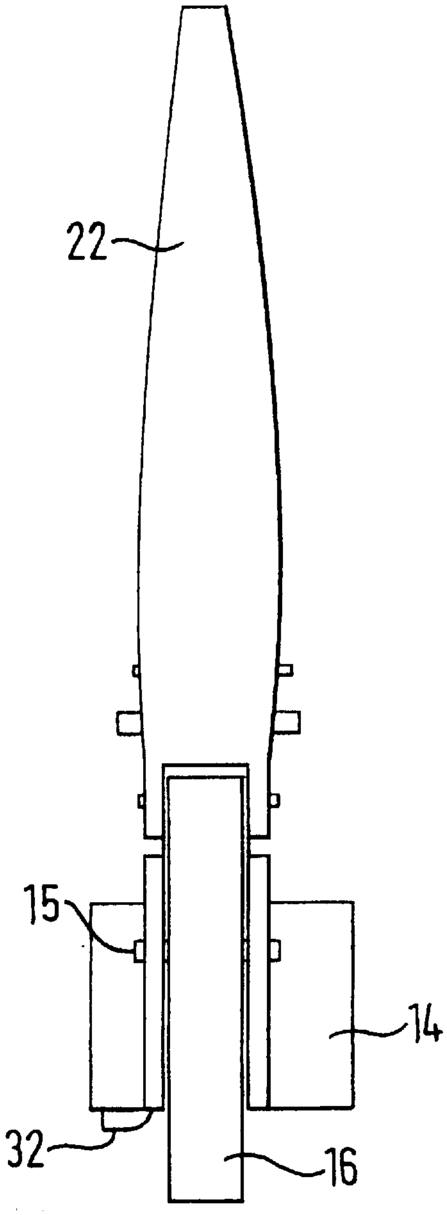
FIG. 3 is a side view of the apparatus.
Figure 4:
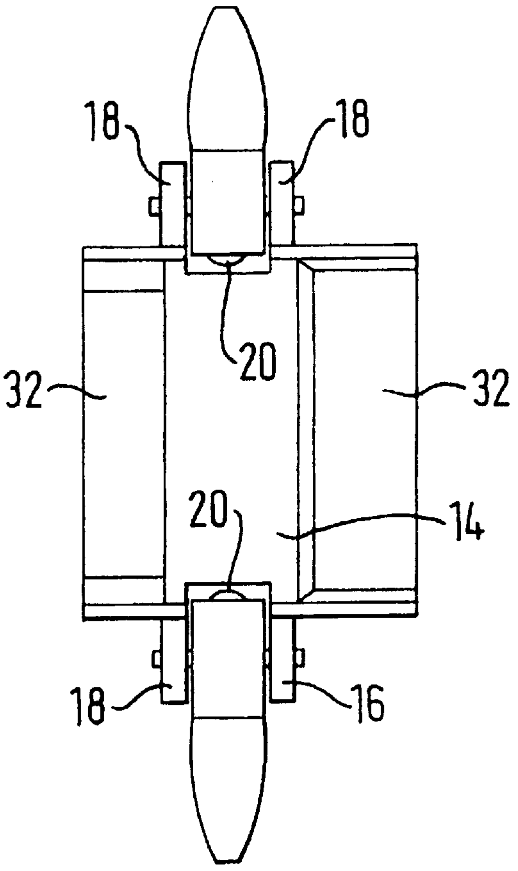
FIG. 4 is an underneath plan view of the apparatus.
Figure 5B:
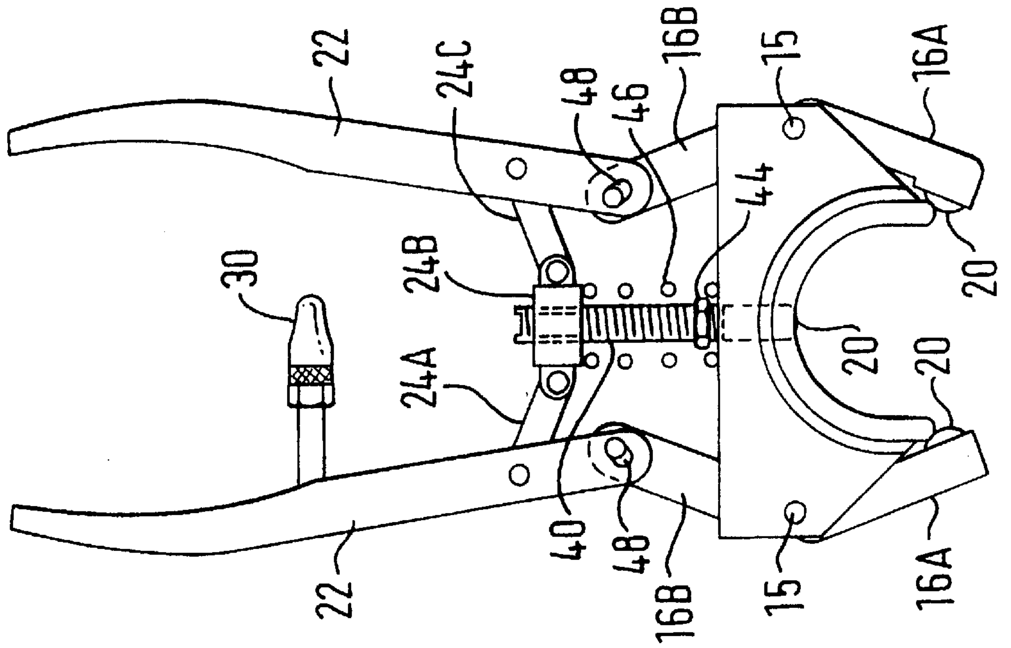
FIG. 5B is a front view of the apparatus showing a third indentation means.
Figure 5A:
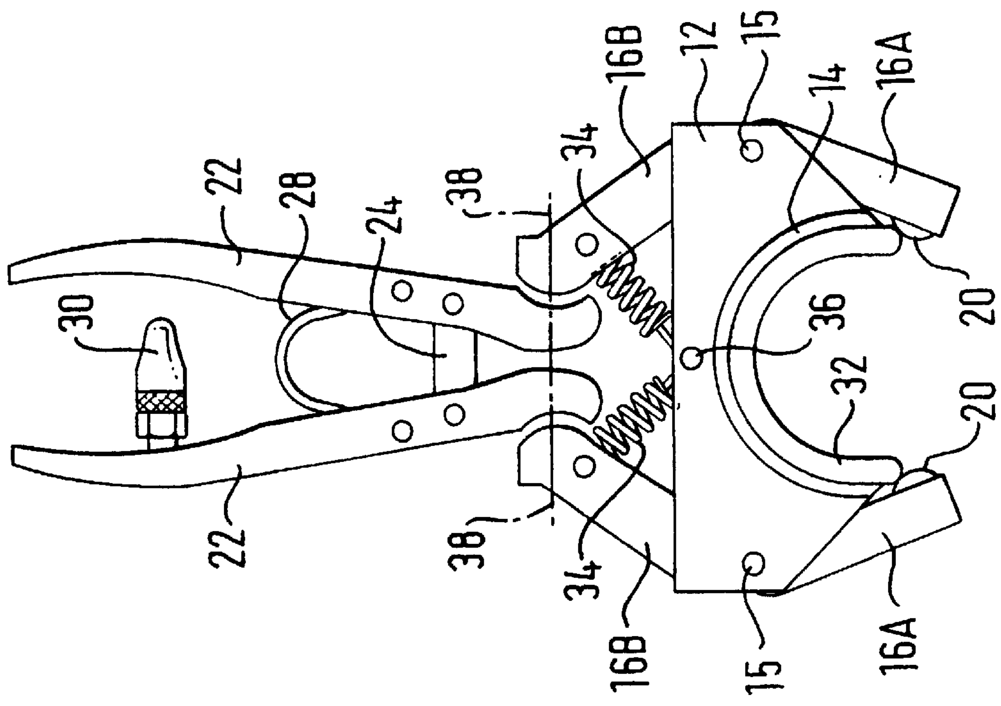
FIG. 5A is a front view of the apparatus showing a second form of connection between the handles and the arms.

Referring to the drawings, a pipe crimping apparatus comprises holding means 10 to externally engage and hold a joint (not shown) to be crimped. The holding means 10 is an elongate block 12 with a concavity in one peripheral side thereof. A part cylindrical plate member 14 is secured in the concavity with its axis normal to the longitudinal axis of the block 12. The concavity and plate member 14 define a part cylindrical clamping zone. On the inside of the plate member 14, two gripping members 32 are provided spaced apart a determined distance to provide with the face of the plate member 14 a complementary shape to the outer shape of the joint.

One pair of crimping arms 16 are pivotally mounted on the block 12, each arm 16 being movable relative to the clamping zone.

Both ends of the block 12 are rebated to provide two cheeks 18 between which a respective crimping arm 16 is pivoted on pin 15. The crimping arms 16 are similarly cranked and mounted in mirror-image on the block 12 with each arm 16 pivoted at its crank to the respective cheeks 18 of the block 12. The distal end of the outer part 16A of each arm 16 has a protuberance 20, formed by a ball-bearing set into a recess, directed inwardly towards the clamping zone provided in the plate member 14. Movement apart of the inner ends of the inner parts 16B of the arms 16 causes inward movement of the distal ends of the outer part 16A of the arms 16. The plate member 14 has opposed cut-outs extending inwards from its respective sides to allow for movement of the outer parts 16A of the arms 16 therethrough.

Means (as shown in FIGS. 1 to 4) is provided to cause movement of the arms 16 relative to the clamping zone wherein the arms 16, in a crimping movement, extend radially into the clamping zone to engage a joint, and the protuberances impress by indentation portions of an outer socket end onto an inner spigot end to secure the same together. The means is a pair of handles 22 with one end of each handle 22 pivoted to a respective inner end of one inner part 16B of an arm 16, the handles 22 being pivoted together through a link 24 near to the one end with the other end of the handles 22 serving as hand grips. Movement of the hand grips together causes movement apart of the inner ends of the arms 16 and consequential radial inward crimping movement of the distal ends of the arms 16. A spring 28 is provided between the two handles 22 as shown to urge the hand grips apart, and a stop 30 is provided on one handle 22 at the hand grip portion to space the handles 22 apart and to prevent the indentations being too deep.

In an alternative form of connection between the handles 22 and the arms 16 and to allow the handles to be at an angular disposition to the block 12 and arms 16, the inner ends 16B of the arms 16 are each connected by a spring 34 to a common anchorage 36 on the block 12. The one end of the handles 22 are connected to the inner ends 16B of the arms 16 by pivot pins 38 (represented by a dotted line) whose axes are at ninety degrees to the other pivot pins and to form knuckle joints whereby the handles 22 can be rotated through up to ninety degrees from the block 12 and be still able to operate the crimping arms 16.

The block 12 has a spindle 26 extending normally from the other longitudinal side to pass through a bore in the link 24, the spindle 26 moving freely through the bore on closing and opening of the hand grips.

Alternatively to the spindle 26, a third indentation means is provided in which a bolt 40 is provided in screw-threaded engagement with link 24 the bolt 40 having a rounded inner end to extend through the block 12 and plate 14 as shown and provide a third protuberance 20, the spaced disposition of the three protuberances 20 being at substantially 60° to each other. A stop 44 is provided by a nut being in screw-threaded engagement on the bolt 40, the stop 44 abutting against the block 12 and being movable to adjust the depth of the protuberance 20. The link 24 in this case is in three hinged parts 24A, 24B and 24C. A coil spring 46 surrounds the bolt 40 and abuts against block 12 and link part 24B. The inner ends of the arms 16 are provided with a slot 48 instead of a pivot hole whereby the pivots of the handles 22 can move theredown during a second stage of use. The spring 46 has a tension which is only overcome when the arms 16 have been moved during a first stage to cause the first two indentations, the bolt 40 then in the second stage moves down to form a third indentation.

In a modificaiton (not shown) of the third indentation means, the stop 44 can be provided above the link part 24B to abut against the top thereof, the bolt being correspondingly altered to provide for such an arrangement.

Figure 6B:
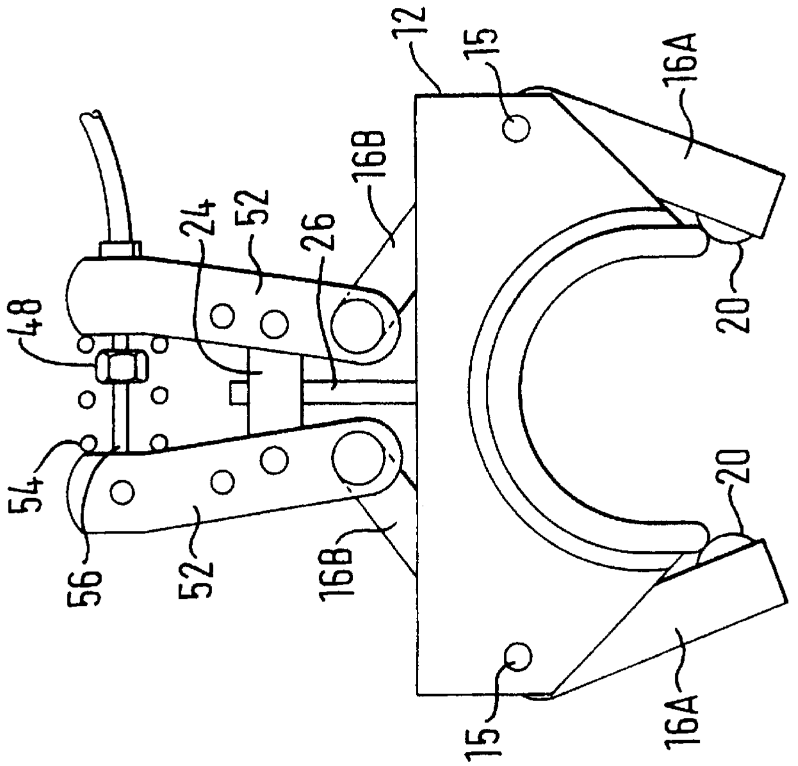
FIGS. 6A and 6B are respectively two modifications of the apparatus showing different means to cause movement.
Figure 6A:
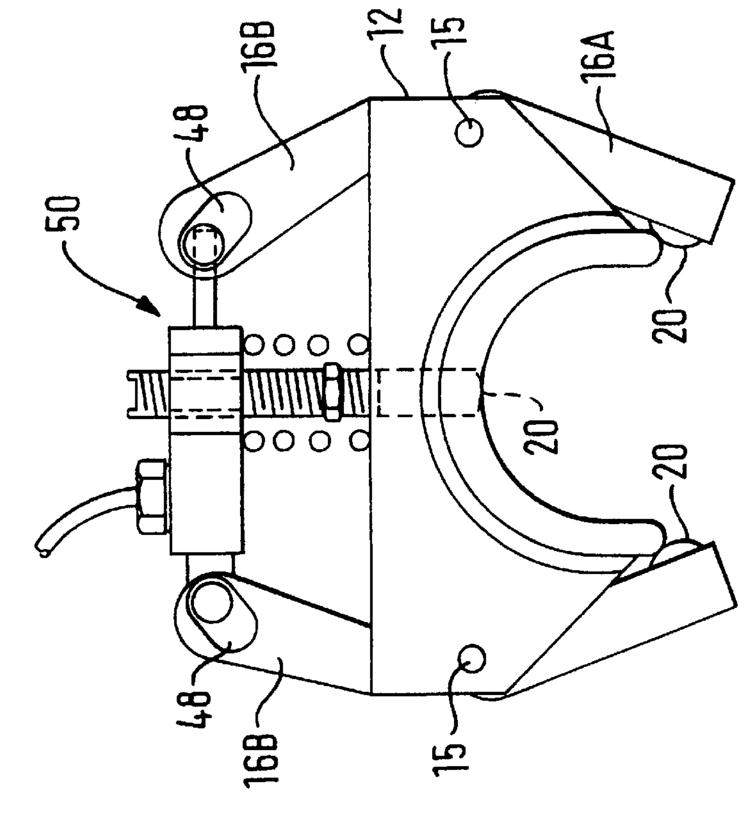

In FIGS. 6A and 6B, alternative movement means are shown. FIG. 6A shows the movement means in the form of a hydraulic or pneumatic cylinder and ram arrangement 50 in which the arrangement 50 replaces the link 24 and is connected between the slots 48 of the inner parts 16B of the arms 16. A third indentation means is provided as shown. FIG. 6B shows the movement means in the form of a Bowden cable arrangement with two small handles 52 and a link 24. The Bowden cable arrangement is positioned between the outer ends of the handles 52 and a coil spring 54 is provided between the handles 52 around cable 56. A stop 58 is provided on the cable 56 between the handles 52. A third indentation means can be provided but is not shown. The operation of both arrangements moving the arms 16 in a similar manner to that described above in the embodiment.

In a first modification, the protuberance 20 is provided by a rounded outer end of a grub screw (not shown) in threaded engagement with a tapped bore in the distal end of the outer part 16A of each arm 16. This modification allows for adjustment in the depth of the protuberance.

In a second modification, an adjustable stop (not shown) is provided in the outer part 16A of each arm 16 inboard of the protuberance 20, the stops being to abut against respective parts of the block 12 to ensure the depth of the indentations is substantially equal.

Variations and modifications can be made without departing from the scope of the invention described above and as claimed hereinafter.

The foregoing relates to preferred exemplary embodiments of the invention, it being understood that other variants and embodiments thereof are possible within the spirit and scope of the invention, the latter being defined by the appended claims.

What is claimed is:

1. A pipe crimping apparatus comprising holding means to externally engage and hold a joint to be crimped, the holding means having a concavity defining a part cylindrical clamping zone, at least one pair of crimping arms pivotally mounted on the holding means, each arm being movable relative to the clamping zone and means to cause movement of the arms relative to the clamping zone wherein the arms, in a crimping movement, extend radially into the clamping zone to engage a joint, and impress by indentation portions of an outer socket end onto an inner spigot end to secure same together wherein the holding means is an elongate block with the concavity in one peripheral side with both ends of the block being rebated to provide two cheeks between which a respective crimping arm is pivoted, the crimping arms being similarly cranked and mounted in mirror-image on the block with each said arm pivoted at its crank to the respective cheeks of the block and a distal end of an outer part of each said arm has a protuberance directed inwardly towards the clamping zone.

2. An apparatus according to claim 1, wherein a part cylindrical plate member is secured in the concavity with its axis normal to a longitudinal axis of the block, the clamping zone being provided in the plate member.

3. An apparatus according to claim 2, wherein the plate member has opposed cut-outs extending inwards from its respective sides to allow for movement of the arms therethrough.

4. An apparatus according to claim 3, wherein the movement means is a cylinder and ram arrangement connected between the inner parts of the arms.

5. An apparatus according to claim 3, wherein the movement means is in form of a bowden cable arrangement connected between two small handles pivoted to the inner parts of the arms.

6. An apparatus according to claim 2, wherein two gripping members are provided on the plate member spaced apart a determined distance to provide with a face of the plate member a complementary shape to the outer shape of a joint to be crimped.

7. An apparatus according to claim 1, wherein each of the arms have an inner part with an inner end and movement apart of the inner ends of the inner parts causes inward movement of the distal ends of the outer part of the arms.

8. An apparatus according to claim 7, wherein the plate member has opposed cut-outs extending inwards from its respective sides to allow for movement of the arms therethrough.

9. An apparatus according to claim 7, wherein the movement means is a cylinder and ram arrangement connected between the inner parts of the arms.

10. An apparatus according to claim 9, wherein a third indentation means is provided acting into the clamping zone from between the inner parts of the arms, a protuberance of said third indentation means and the other two protuberances being substantially equi-spaced apart.

11. An apparatus according to claim 7, wherein the movement means is in form of a bowden cable arrangement connected between two small handles pivoted to the inner parts of the arms.

12. An apparatus according to claim 11, wherein a third indentation means is provided acting into the clamping zone from between the inner parts of the arms, a protuberance of said third indentation means and the other two protuberances being substantially equi-spaced apart.

13. An apparatus according to claim 7, wherein a third indentation means is provided acting into the clamping zone from between the inner parts of the arms, a protuberance of said third indentation means and the other two protuberances being substantially equi-spaced apart.

14. An apparatus as claimed in claim 7, wherein two gripping members are provided on the plate member spaced apart a determined distance to provide with a face of the plate member a complementary shape to the outer shape of a joint to be crimped.

15. An apparatus according to claim 1, wherein the means to cause movement is a pair of handles with one end of each handle pivoted to a respective inner end of one inner part of an arm, the handles being pivoted together through a link near to the one end with an other end of each handle serving as a hand grip.

16. An apparatus according to claim 15, wherein movement of the hand grips together causes movement apart of the inner ends of the arms and consequential inward crimping movement of the distal ends of the arms.

17. An apparatus according to claim 16, wherein the block has a spindle extending normally from one longitudinal side to pass through a bore in the link, the spindle moving freely through the bore on closing and opening of the hand grips.

18. An apparatus according to claim 15, wherein the block has a spindle extending normally from one longitudinal side to pass through a bore in the link, the spindle moving freely through the bore on closing and opening of the hand grips.

19. An apparatus according to claim 16, wherein each said handle is connected to a respective crimping arm through a knuckle joint.

20. An apparatus as claimed in claim 1, wherein the movement means is in the form of a bowden cable arrangement connected between two small handles pivoted to the inner parts of the arms.

21. An apparatus as claimed in claim 1, wherein a third indentation means is provided acting into the clamping zone from between the inner parts of the arms, a protuberance of said third indentation means and the other two protuberances being substantially equi-spaced apart.

* * * * *

UNITED STATES PATENT AND TRADEMARK OFFICE

CERTIFICATE OF CORRECTION

PATENT NO. : 6,317,950 B1
DATED : November 20, 2001
INVENTOR(S) : William James Irwin It is certified that error appears in the above-identified patent and that said Letters Patent is hereby corrected as shown below:

Title page,
Item [75], should read as follows:
-- [75] William James Irwin, County Londonderry, Northern Ireland (UK) --
Please omit item [73]; this patent is not assigned.

Signed and Sealed this

Twenty-seventh Day of August, 2002

*Attest:*

JAMES E. ROGAN

*Attesting Officer* *Director of the United States Patent and Trademark Office*